United States Patent
Srinivasan et al.

(10) Patent No.: US 12,259,862 B2
(45) Date of Patent: Mar. 25, 2025

(54) METHOD AND SYSTEM FOR AUTOMATIC MANAGEMENT OF CRITICAL COMPUTING METRICS

(71) Applicant: JPMorgan Chase Bank, N.A., New York, NY (US)

(72) Inventors: Anitha Srinivasan, Plano, TX (US); Lane MacDougall, Keller, TX (US); Rob Locurto, Marlboro, NJ (US); Dilan Weerasinghe, Bournemouth (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/230,463

(22) Filed: Aug. 4, 2023

(65) Prior Publication Data
US 2025/0045259 A1 Feb. 6, 2025

(51) Int. Cl.
*G06F 16/21* (2019.01)
*G06F 16/28* (2019.01)

(52) U.S. Cl.
CPC .......... *G06F 16/219* (2019.01); *G06F 16/288* (2019.01)

(58) Field of Classification Search
CPC .................................... G06F 16/219
USPC .......................................... 707/738
See application file for complete search history.

(56) References Cited

U.S. PATENT DOCUMENTS

| | | | |
|---|---|---|---|
| 2020/0073982 A1* | 3/2020 | Kolluri Venkata Sesha | G06F 11/3082 |
| 2023/0229411 A1* | 7/2023 | Thakkar | G06N 20/20 |
| 2024/0160850 A1* | 5/2024 | Hoots | G06F 16/345 |

FOREIGN PATENT DOCUMENTS

CN 117992416 A * 5/2024

* cited by examiner

*Primary Examiner* — Syling Yen
(74) *Attorney, Agent, or Firm* — Greenblum & Bernstein, P.L.C.

(57) ABSTRACT

A method for facilitating automated management of computing metrics is disclosed. The method includes aggregating, via an application programming interface, unstructured data from various computing components, the unstructured data including application log data; parsing the unstructured data to generate structured data sets, each of the structured data sets including textual data; extracting time series data from the structured data sets, the time series data relating to performance metrics of the computing components; generating, by using a model, a summary of the textual data in the structured data sets; correlating, by using the model, the summary of the textual data with the time series data; and determining, by using the model, a characteristic for each of the performance metrics based on a result of the correlating, the characteristic including a criticality characteristic.

20 Claims, 7 Drawing Sheets

METHOD AND SYSTEM FOR AUTOMATIC MANAGEMENT OF CRITICAL COMPUTING METRICS

BACKGROUND

1. Field of the Disclosure

This technology generally relates to methods and systems for managing computing metrics, and more particularly to methods and systems for facilitating management of computing metrics by providing automated identification of critical application, system, and infrastructure metrics via artificial intelligence and machine learning.

2. Background Information

Many business entities maintain large and complex computing environments based on various performance metrics that are aggregated from computing components such as, for example, application components and infrastructure components. Often, these performance metrics provide numerical and/or other measurable indicators for factors and/or parameters that define the operating conditions of the computing environments. Historically, implementations of conventional management techniques for these performance metrics have resulted in varying degrees of success with respect to identifying critical application, system, and infrastructure metrics for automated system maintenance.

One drawback of implementing the conventional management techniques is that in many instances, each computing component collects multiple different types of performance metrics, some of which are not critical to the performance of the computing environments. As a result, important insight may be overlooked when too few performance metrics are monitored. Alternatively, resources may be inefficiently allocated when too many performance metrics are monitored. In addition, continuous upgrades and/or modifications to the computing environments may cause certain performance metrics to lose criticality.

Therefore, there is a need to leverage artificial intelligence and machine learning to provide automated identification of critical application, system, and infrastructure metrics for effective management and maintenance of the computing environments.

SUMMARY

The present disclosure, through one or more of its various aspects, embodiments, and/or specific features or sub-components, provides, inter alia, various systems, servers, devices, methods, media, programs, and platforms for facilitating management of computing metrics by providing automated identification of critical application, system, and infrastructure metrics via artificial intelligence and machine learning.

According to an aspect of the present disclosure, a method for facilitating automated management of computing metrics is disclosed. The method is implemented by at least one processor. The method may include aggregating, via an application programming interface, unstructured data from at least one computing component, the unstructured data may include application log data; parsing the unstructured data to generate at least one structured data set, each of the at least one structured data set may include textual data; extracting time series data from the at least one structured data set, the time series data may relate to at least one performance metric of the at least one computing component; generating, by using at least one model, a summary of the textual data in the at least one structured data set; correlating, by using the at least one model, the summary of the textual data with the time series data; and determining, by using the at least one model, at least one characteristic for each of the at least one performance metric based on a result of the correlating, the at least one characteristic may include a criticality characteristic.

In accordance with an exemplary embodiment, the method may further include monitoring each of the at least one performance metric based on the corresponding criticality characteristic; detecting, by using the at least one model, at least one anomaly in the at least one performance metric based on the monitoring; and determining, by using the at least one model, a first resolution action to remedy each of the at least one anomaly.

In accordance with an exemplary embodiment, the method may further include determining, by using the at least one model, at least one predicted error based on the monitoring of the at least one performance metric; and determining, by using the at least one model, a second resolution action to remedy each of the at least one predicted error.

In accordance with an exemplary embodiment, the first resolution action and the second resolution action may be determined based on historical data that correspond to the at least one computing component, the historical data may include at least one from among historical outage data from incident tickets, historical alert data, and historical resolution data.

In accordance with an exemplary embodiment, the at least one computing component may include at least one from among an application component and an infrastructure component.

In accordance with an exemplary embodiment, the unstructured data may be parsed by using at least one from among a named entity recognition algorithm and a topic modeling algorithm.

In accordance with an exemplary embodiment, the textual data may include service data, performance metric data, and dependency data, the performance metric data may include application performance data, computing system performance data, and computing infrastructure performance data.

In accordance with an exemplary embodiment, the method may further include determining, by using the at least one model, at least one explanation for each of the at least one characteristic, wherein each of the at least one explanation may include information in a natural language format; and wherein each of the at least one explanation may include the textual data that contributed to the determining of the at least one characteristic.

In accordance with an exemplary embodiment, the at least one model may include at least one from among a large language model, a deep learning model, a neural network model, a natural language processing model, a machine learning model, a mathematical model, a process model, and a data model.

According to an aspect of the present disclosure, a computing device configured to implement an execution of a method for facilitating automated management of computing metrics is disclosed. The computing device including a processor; a memory; and a communication interface coupled to each of the processor and the memory, wherein the processor may be configured to aggregate, via an application programming interface, unstructured data from at least one computing component, the unstructured data may include application log data; parse the unstructured data to generate at least one structured data set, each of the at least one structured data set may include textual data; extract time series data from the at least one structured data set, the time series data may relate to at least one performance metric of the at least one computing component; generate, by using at least one model, a summary of the textual data in the at least one structured data set; correlate, by using the at least one model, the summary of the textual data with the time series data; and determine, by using the at least one model, at least one characteristic for each of the at least one performance metric based on a result of the correlating, the at least one characteristic may include a criticality characteristic.

In accordance with an exemplary embodiment, the processor may be further configured to monitor each of the at least one performance metric based on the corresponding criticality characteristic; detect, by using the at least one model, at least one anomaly in the at least one performance metric based on the monitoring; and determine, by using the at least one model, a first resolution action to remedy each of the at least one anomaly.

In accordance with an exemplary embodiment, the processor may be further configured to determine, by using the at least one model, at least one predicted error based on the monitoring of the at least one performance metric; and determine, by using the at least one model, a second resolution action to remedy each of the at least one predicted error.

In accordance with an exemplary embodiment, the processor may be further configured to determine the first resolution action and the second resolution action based on historical data that correspond to the at least one computing component, the historical data may include at least one from among historical outage data from incident tickets, historical alert data, and historical resolution data.

In accordance with an exemplary embodiment, the at least one computing component may include at least one from among an application component and an infrastructure component.

In accordance with an exemplary embodiment, the processor may be further configured to parse the unstructured data by using at least one from among a named entity recognition algorithm and a topic modeling algorithm.

In accordance with an exemplary embodiment, the textual data may include service data, performance metric data, and dependency data, the performance metric data may include application performance data, computing system performance data, and computing infrastructure performance data.

In accordance with an exemplary embodiment, the processor may be further configured to determine, by using the at least one model, at least one explanation for each of the at least one characteristic, wherein each of the at least one explanation may include information in a natural language format; and wherein each of the at least one explanation may include the textual data that contributed to the determining of the at least one characteristic.

In accordance with an exemplary embodiment, the at least one model may include at least one from among a large language model, a deep learning model, a neural network model, a natural language processing model, a machine learning model, a mathematical model, a process model, and a data model.

According to an aspect of the present disclosure, a non-transitory computer readable storage medium storing instructions for facilitating automated management of computing metrics is disclosed. The storage medium including executable code which, when executed by a processor, may cause the processor to aggregate, via an application programming interface, unstructured data from at least one computing component, the unstructured data may include application log data; parse the unstructured data to generate at least one structured data set, each of the at least one structured data set may include textual data; extract time series data from the at least one structured data set, the time series data may relate to at least one performance metric of the at least one computing component; generate, by using at least one model, a summary of the textual data in the at least one structured data set; correlate, by using the at least one model, the summary of the textual data with the time series data; and determine, by using the at least one model, at least one characteristic for each of the at least one performance metric based on a result of the correlating, the at least one characteristic may include a criticality characteristic.

In accordance with an exemplary embodiment, when executed by the processor, the executable code may further cause the processor to monitor each of the at least one performance metric based on the corresponding criticality characteristic; detect at least one anomaly in the at least one performance metric based on the monitoring; and determine, by using the at least one model, a first resolution action to remedy each of the at least one anomaly.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
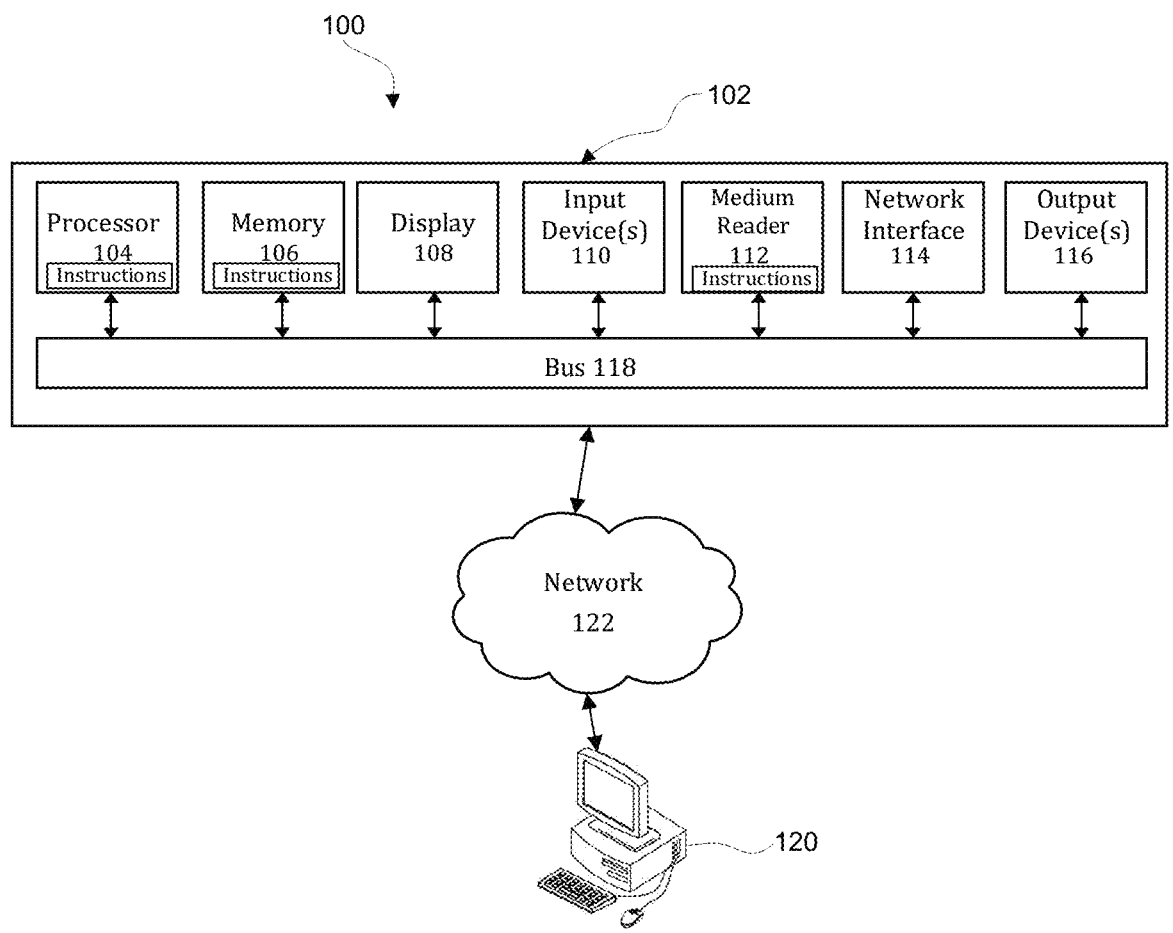
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning system (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a GPS device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating management of computing metrics by providing automated identification of critical application, system, and infrastructure metrics via artificial intelligence and machine learning.

Figure 2:
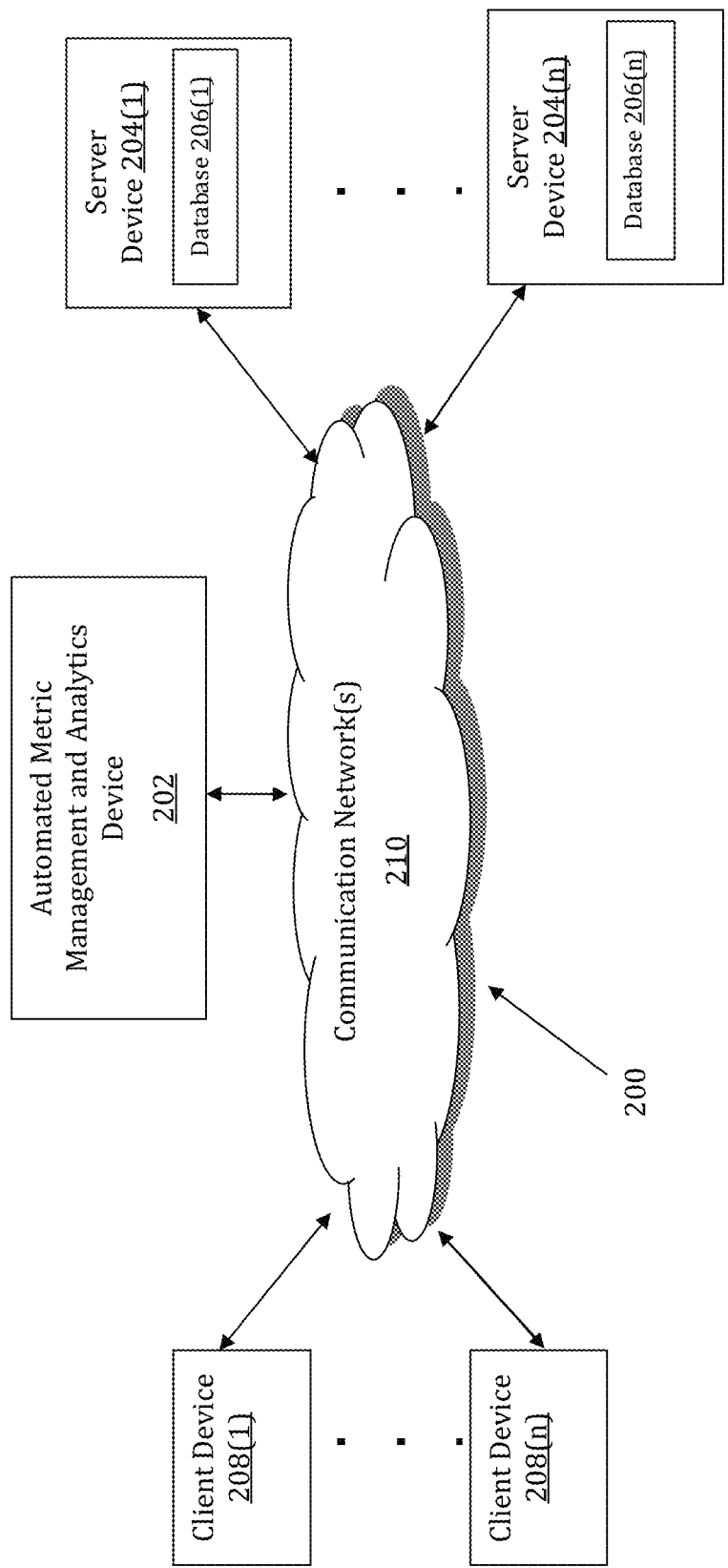
FIG. 2 illustrates an exemplary diagram of a network environment.

Referring to FIG. 2, a schematic of an exemplary network environment 200 for implementing a method for facilitating management of computing metrics by providing automated identification of critical application, system, and infrastructure metrics via artificial intelligence and machine learning is illustrated. In an exemplary embodiment, the method is executable on any networked computer platform, such as, for example, a personal computer (PC).

The method for facilitating management of computing metrics by providing automated identification of critical application, system, and infrastructure metrics via artificial intelligence and machine learning may be implemented by an Automated Metric Management and Analytics (AMMA) device 202. The AMMA device 202 may be the same or similar to the computer system 102 as described with respect to FIG. 1. The AMMA device 202 may store one or more applications that can include executable instructions that, when executed by the AMMA device 202, cause the AMMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AMMA device 202 itself, may be located in virtual server(s) running in a cloud-based computing environment rather than being tied to one or more specific physical network computing devices. Also, the application(s) may be running in one or more virtual machines (VMs) executing on the AMMA device 202. Additionally, in one or more embodiments of this technology, virtual machine(s) running on the AMMA device 202 may be managed or supervised by a hypervisor.

In the network environment 200 of FIG. 2, the AMMA device 202 is coupled to a plurality of server devices 204(1)-204(n) that hosts a plurality of databases 206(1)-206(n), and also to a plurality of client devices 208(1)-208(n) via communication network(s) 210. A communication interface of the AMMA device 202, such as the network interface 114 of the computer system 102 of FIG. 1, operatively couples and communicates between the AMMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AMMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and AMMA devices that efficiently implement a method for facilitating management of computing metrics by providing automated identification of critical application, system, and infrastructure metrics via artificial intelligence and machine learning.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AMMA device 202 may be a standalone device or integrated with one or more other devices or apparatuses, such as one or more of the server devices 204(1)-204(n), for example. In one particular example, the AMMA device 202 may include or be hosted by one of the server devices 204(1)-204(n), and other arrangements are also possible. Moreover, one or more of the devices of the AMMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AMMA device 202 via the communication network(s) 210 according to the HTTP-based and/or JavaScript® Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to unstructured data, application log data, structured data sets, textual data, time series data, performance metrics, text summaries, machine learning models, correlation data, and criticality characteristics.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the AMMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the AMMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the AMMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AMMA device 202, the server devices 204(1)-204(n), or the client devices 208(1)-208(n), for example, may be configured to operate as virtual instances on the same physical machine. In other words, one or more of the AMMA device 202, the server devices 204(1)-204(n), or the client devices 208(1)-208(n) may operate on the same physical device rather than as separate devices communicating through communication network(s) 210. Additionally, there may be more or fewer AMMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
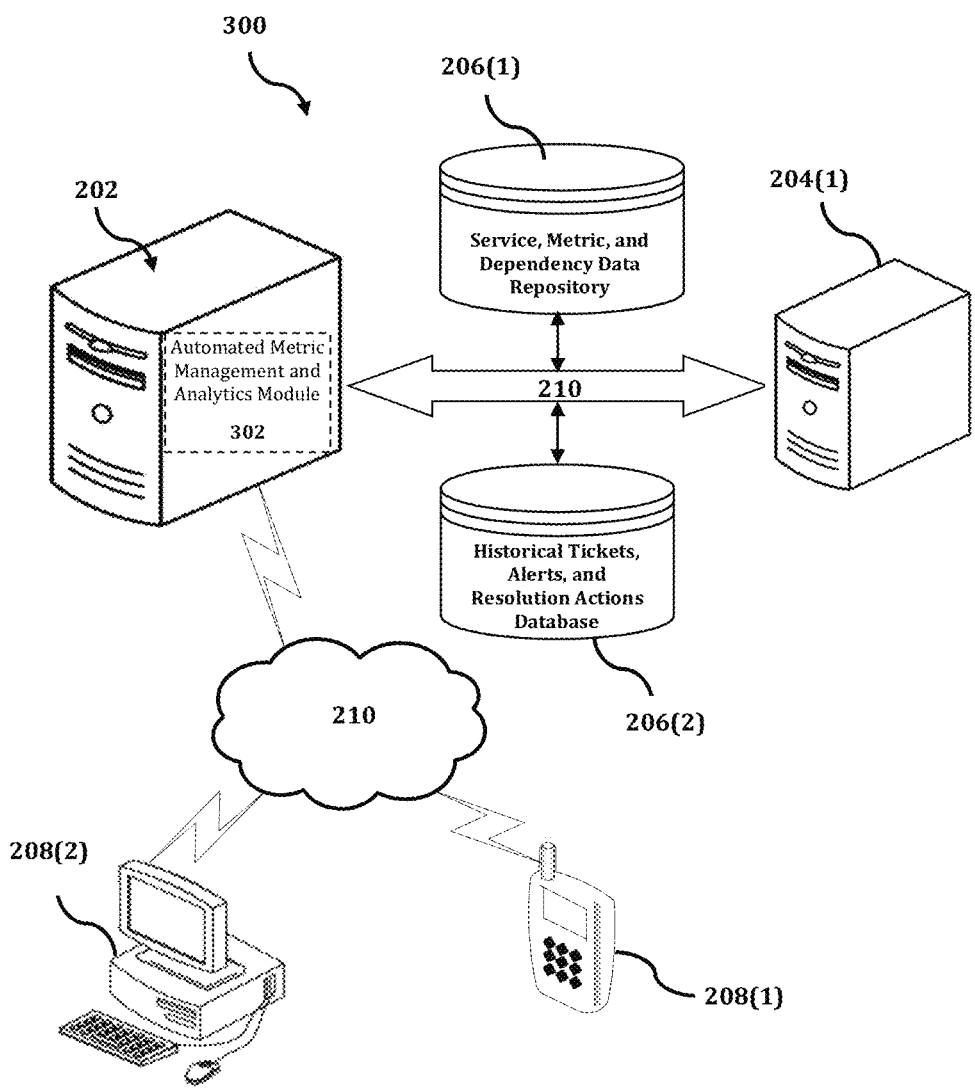
FIG. 3 shows an exemplary system for implementing a method for facilitating management of computing metrics by providing automated identification of critical application, system, and infrastructure metrics via artificial intelligence and machine learning.

The AMMA device 202 is described and shown in FIG. 3 as including an automated metric management and analytics module 302, although it may include other rules, policies, modules, databases, or applications, for example. As will be described below, the automated metric management and analytics module 302 is configured to implement a method for facilitating management of computing metrics by providing automated identification of critical application, system, and infrastructure metrics via artificial intelligence and machine learning.

An exemplary process 300 for implementing a mechanism for facilitating management of computing metrics by providing automated identification of critical application, system, and infrastructure metrics via artificial intelligence and machine learning by utilizing the network environment of FIG. 2 is shown as being executed in FIG. 3. Specifically, a first client device 208(1) and a second client device 208(2) are illustrated as being in communication with AMMA device 202. In this regard, the first client device 208(1) and the second client device 208(2) may be "clients" of the AMMA device 202 and are described herein as such. Nevertheless, it is to be known and understood that the first client device 208(1) and/or the second client device 208(2) need not necessarily be "clients" of the AMMA device 202, or any entity described in association therewith herein. Any additional or alternative relationship may exist between either or both of the first client device 208(1) and the second client device 208(2) and the AMMA device 202, or no relationship may exist.

Further, AMMA device 202 is illustrated as being able to access a service, metric, and dependency data repository 206(1) and a historical tickets, alerts, and resolution actions database 206(2). The automated metric management and analytics module 302 may be configured to access these databases for implementing a method for facilitating management of computing metrics by providing automated identification of critical application, system, and infrastructure metrics via artificial intelligence and machine learning.

The first client device 208(1) may be, for example, a smart phone. Of course, the first client device 208(1) may be any additional device described herein. The second client device 208(2) may be, for example, a PC. Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AMMA device 202 via broadband or cellular communication. Of course, these embodiments are merely exemplary and are not limiting or exhaustive.

Upon being started, the automated metric management and analytics module 302 executes a process for facilitating management of computing metrics by providing automated identification of critical application, system, and infrastructure metrics via artificial intelligence and machine learning. An exemplary process for facilitating management of computing metrics by providing automated identification of critical application, system, and infrastructure metrics via artificial intelligence and machine learning is generally indicated at flowchart 400 in FIG. 4.

Figure 4:
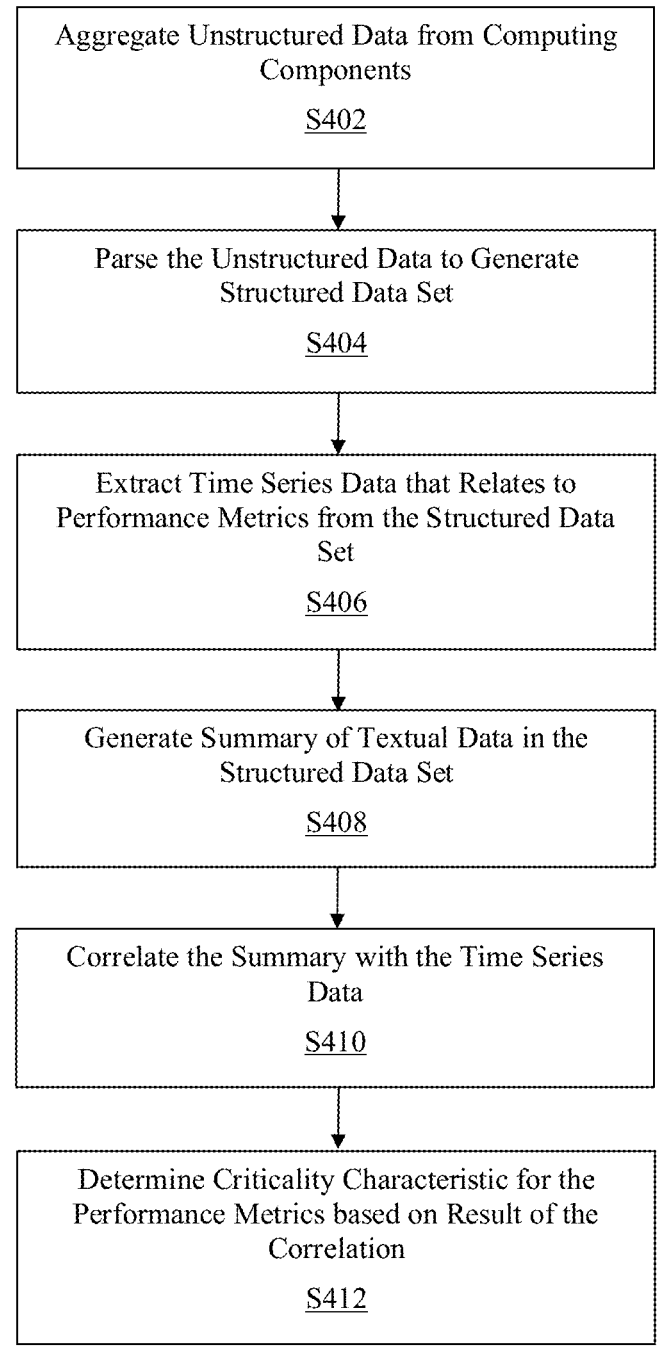
FIG. 4 is a flowchart of an exemplary process for implementing a method for facilitating management of computing metrics by providing automated identification of critical application, system, and infrastructure metrics via artificial intelligence and machine learning.

In the process 400 of FIG. 4, at step S402, unstructured data may be aggregated from various computing components in a computing environment. The unstructured data may be aggregated from the computing components via an application programming interface. In an exemplary embodiment, the unstructured data may include application log data. The application log data may relate to a computing file that contains information about events that have occurred with a software application. The information may include performance metrics of the application at the time of the event. The information may also include errors and warnings as well as other informational events. The events may be logged out by the application and written to the computing file.

In another exemplary embodiment, the computing components may include at least one from among an application component and an infrastructure component. The application components may relate to software applications within the computing environment while infrastructure components may relate to framework that supports and facilitates communication between the applications. The infrastructure components may include communication interfaces such as, for example, an application programming interface that facilitates the communication between one application and another.

In another exemplary embodiment, the applications may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, the unstructured data may be parsed to generate structured data sets. In an exemplary embodiment, the structured data sets may include textual data that have been organized by using machine learning processes. The textual data may include service data, performance metric data, and dependency data. The service data may provide information related to services such as, for example, network services that are associated with the computing components. Similarly, the dependency data may provide information related to other computing components that depend on the computing components. The performance metric data may include application performance data, computing system performance data, and computing infrastructure performance data.

In another exemplary embodiment, the unstructured data may be parsed by using at least one from among a named entity recognition algorithm and a topic modeling algorithm. The unstructured data may be automatically parsed to generate the structured data sets without additional user input. The named entity recognition algorithm and the topic modeling algorithm may be implemented by any machine learning model disclosed in the present disclosure.

In another exemplary embodiment, the named entity recognition algorithm may be usable to identify key information in the textual data for classification into a set of predefined categories. The named entity recognition algorithm may locate named entities that are mentioned in unstructured text. The named entities may then be classified into predefined categories such as, for example, names, locations, and quantities. For example, the named entity recognition algorithm may be used to extract entities from application log messages.

In another exemplary embodiment, the topic modeling algorithm may relate to a type of statistical modeling that uses unsupervised machine learning to identify clusters and/or groups of similar words within a body of text. The topic modeling algorithm may utilize semantic structures in the text to understand unstructured data without predefined tags and/or training data. Texts in the unstructured data may be analyzed to identify common themes that correspond to the identified clusters of similar words. For example, the topic modeling algorithm may be used to identify analogous performance metrics based on a common clustering of parameters.

At step S406, time series data may be extracted from the structured data sets. The time series data may relate to performance metrics of the computing components. In an exemplary embodiment, the time series data may include historical values of various application services. The time series data may correspond to a sequence of data points such as, for example, performance metrics that have been indexed in time order. The data points may consist of successive measurements made from similar sources over a fixed time interval. Consistent with present disclosures the time series data may be usable to track change over time.

In another exemplary embodiment, the time series data may be identified and extracted from the aggregated data. That is, the aggregated data may already include data in a time series format. For example, the aggregated data may already include a sequence of latency data in time order. Alternatively, relevant data may be automatically identified from the aggregated data for structuring into a time series data format. For example, a collection of latency data points may be automatically identified from the aggregated data and structured into a time ordered sequence based on corresponding timestamps.

At step S408, a summary of the textual data in the structured data sets may be generated. The summary may be automatically generated by using various models to reduce the quantity of available information and filter out unnecessary data. In an exemplary embodiment, the models may be usable to identify pertinent information for extraction. For example, the models may identify necessary information related to functionalities of an application for extraction. The pertinent information may include association data that links one data set to another. For example, the pertinent information may include association data that links performance metrics with corresponding applications. Then, the summary may be automatically generated to include the pertinent information.

In another exemplary embodiment, the models may include at least one from among a large language model, a deep learning model, a neural network model, a natural language processing model, a machine learning model, a mathematical model, a process model, and a data model. The language model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori algorithm analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the machine learning process may include a neural network that relates to at least one from among an artificial neural network and a simulated neural network. The neural network may correspond to a technique in artificial intelligence that teaches computers to process data by using interconnected processing nodes and/or artificial neurons. The neural network may relate to a type of machine learning such as, for example, deep learning that uses interconnected nodes and/or artificial neurons in a layered structure to transform inputs for predictive analytics.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the large language model may relate to a trained deep-learning model that understands and generates text in a human-like fashion. The large language model may recognize, summarize, translate, predict, and generate various types of text as well as content based on knowledge gained from massive data sets. In another exemplary embodiment, the large language model may correspond to a language model that consists of a neural network with many parameters such as, for example, weights. The language model may be trained on large quantities of unlabeled and labeled text by using self-supervised learning or semi-supervised learning. The trained language model may be usable to capture syntax and semantics of human language.

In another exemplary embodiment, the natural language processing model may correspond to a plurality of natural language processing techniques. The natural language processing techniques may include at least one from among a sentiment analysis technique, a named entity recognition technique, a summarization technique, a topic modeling technique, a text classification technique, a keyword extraction technique, and a lemmatization and stemming technique. As will be appreciated by a person of ordinary skill in the art, natural language processing may relate to computer processing and analyzing of large quantities of natural language data.

At step S410, the summary of the textual data may be correlated with the time series data. The correlation may be automatically facilitated by using the models. In an exemplary embodiment, the correlation may be facilitated by using analysis techniques such as, for example, convolutional neural network analysis to identify relationships and/or connections between data points in the summary and data points in the time series data. The analysis techniques may determine that one data point in one data set affects and/or depends on another data point in another data set. For example, an increase in latency at a particular point in time may be correlated with a service ticket from a user at that point in time to indicate a connection between the latency metric and the performance of the computing environment. That is, performance of the computing environment may be deemed to depend on the latency metric.

At step S412, characteristics for each of the performance metrics may be determined based on a result of the correlating. The characteristics may be automatically determined by using the models according to predetermined guidelines and historical failure data. In an exemplary embodiment, the characteristics may include a criticality characteristic. The criticality characteristic may indicate the importance of the performance metric to the operation of the computing environment. For example, a latency metric may be assigned a critical characteristic to indicate that latency is important to the operation of the computing environment.

In another exemplary embodiment, the criticality characteristics may include various levels to indicate a degree of importance. The levels of importance may be automatically determined by using the models based on performance metric contribution to operability of the computing environment. The levels of importance may include a high level of importance, a moderate level of importance, and a low level of importance. For example, the latency metric may be assigned a high level of importance because latency drastically affects performance of the computing environment and user experience. Alternatively, while drastically affecting performance, the latency metric may be assigned a moderate level of importance because increased latency does not result in immediate computing environment failure.

In another exemplary embodiment, the determined characteristics may be usable to facilitate the monitoring of the computing components based on the performance metrics. The performance metrics of the computing components that satisfies a predetermined criticality threshold may be monitored to identify any deviations from normal operating parameters. For example, a latency metric may be monitored to track operation of the computing components when the latency metric is deemed to be a critical metric based on the corresponding criticality characteristic. The latency metric may be deemed to be a critical metric of the computing components when the corresponding criticality characteristic exceeds the predetermined criticality threshold. System resources may be effectively allocated by selectively monitoring critical metrics that impact system performance instead of generally monitoring all available metrics of the system.

In another exemplary embodiment, to facilitate the monitoring, each of the performance metrics that are associated with the computing components may be monitored based on the corresponding criticality characteristics. Consistent with present disclosures, only the performance metrics that are deemed to be critical to the operability of the computing component and/or the computing environment based on the corresponding criticality characteristics may be monitored.

Then, anomalies in the performance metrics may be detected based on the monitoring. The models may be usable to detect changes in the performance metrics that currently impacts the performance of the computing components and/or the computing environment. For example, the models may identify patterns in changing latency metrics of certain computing components that indicates a slowdown in the computing environment. Alternatively, the models may be usable to detect changes in the performance metrics that indicates a future impact to the performance of the computing components and/or the computing environment. The anomalies may indicate a deviation from expected operating parameters of the computing components that may potentially cause issues in the computing environment. For example, the models may identify patterns in changing latency metrics of certain computing components that indicates a potential interruption of service for a user.

Further, resolution actions to remedy each of the anomalies may be determined by using the models. The resolution actions may relate to a self-healing action that may be automatically initiated to resolve any issues and/or potential issues in the computing environment. For example, the resolution actions may include the addition of computing resources to the computing environment to balance the monitored latency metrics.

The resolution actions may be determined based on predetermined guidelines for resolving specific anomalies as well as based on historical resolution information of past anomalies. For example, specific resolution actions may be predetermined based on a business guideline for latency type anomalies. Alternatively, the models may be usable to identify resolution actions from analogous anomalies that may be usable to resolve the currently detected latency type anomalies. Similarly, the resolution actions may be determined based on historical data that corresponds to the computing components. The historical data may include at least one from among historical outage data from incident tickets, historical alert data, and historical resolution data.

In another exemplary embodiment, predicted errors in the computing environment may be determined based on the monitoring of the critical performance metrics and time series forecasting. The models may be usable to determine the predicted errors based on anticipated changes and/or anomalies in the critical performance metrics. For example, the models may identify patterns in the forecasted, critical performance metrics that indicate an impending failure in the computing environment.

Then, resolution actions to remedy each of the predicted errors may be determined by using the models. The resolution actions may relate to a self-healing action that may be automatically initiated to resolve various factors that contribute to the predicted errors. The resolution actions may be determined based on predetermined guidelines for resolving specific errors as well as based on historical resolution information of analogous errors. Similarly, the resolution actions may be determined based on historical data that corresponds to the computing components. The historical data may include at least one from among historical outage data from incident tickets, historical alert data, and historical resolution data.

In another exemplary embodiment, explanations may be determined for each of the characteristics. The explanations may be determined by using a model based on correlation data. Each of the explanations may include information in a natural language format. For example, the explanations may be presented in a natural language manner to explain why certain performance metrics have been determined to be critically important. Each of the explanations may also include the textual data that contributed to the determining of the characteristics. For example, the explanations may include information that the models indicated as factors that contributed to determining the criticality of the performance metrics.

In another exemplary embodiment, an output may be automatically generated for a user. The output may include the explanations as well as information that relates to the text summarization, the correlation, the determination of the characteristics, and any related resolution actions that have been automatically initiated. The output may correspond to a report that is generated for sending to appropriate users based on predetermined guidelines and/or user preferences. In another exemplary embodiment, the output may be cataloged for persistence in a repository. The output may serve as documentation of the automated identification process as well as the automated resolution process.

Figure 5:
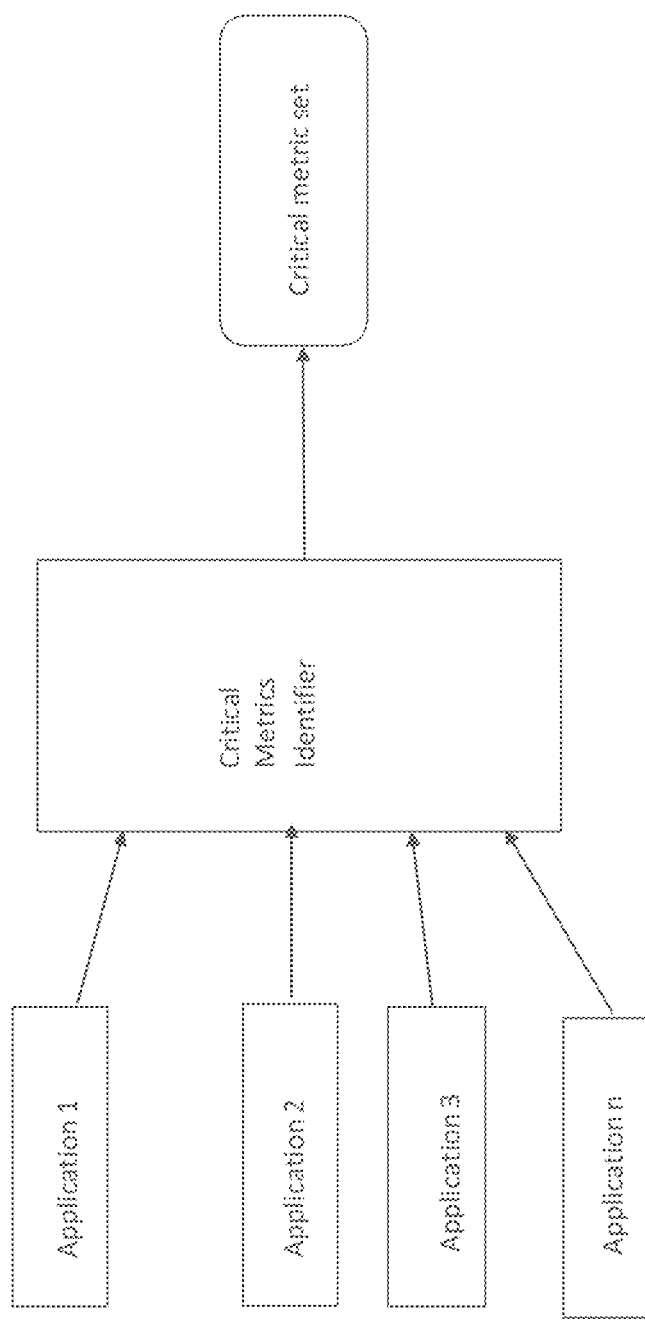
FIG. 5 is a flow diagram of an exemplary critical metric identification process for implementing a method for facilitating management of computing metrics by providing automated identification of critical application, system, and infrastructure metrics via artificial intelligence and machine learning.

FIG. 5 is a flow diagram 500 of an exemplary critical metric identification process for implementing a method for facilitating management of computing metrics by providing automated identification of critical application, system, and infrastructure metrics via artificial intelligence and machine learning. In FIG. 5, a set of critical application, system, and infrastructure metrics may be automatically identified.

As illustrated in FIG. 5, unstructured data may be aggregated from various applications. The unstructured data may be parsed to facilitate the automatic identification of metric characteristics consistent with present disclosures. Then, the disclosed invention may output a set of critical performance metrics based on the criticality of the corresponding metric characteristics.

Figure 6:
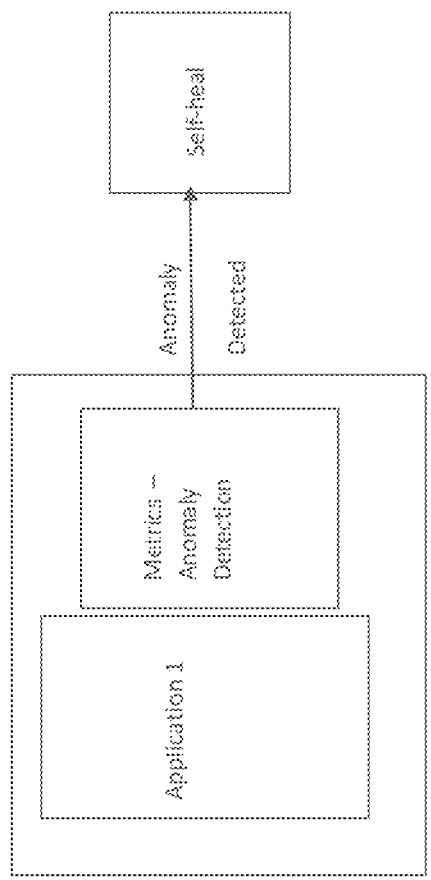
FIG. 6 is a flow diagram of an exemplary critical metric monitoring and self-healing process for implementing a method for facilitating management of computing metrics by providing automated identification of critical application, system, and infrastructure metrics via artificial intelligence and machine learning.

FIG. 6 is a flow diagram 600 of an exemplary critical metric monitoring and self-healing process for implementing a method for facilitating management of computing metrics by providing automated identification of critical application, system, and infrastructure metrics via artificial intelligence and machine learning. In FIG. 6, automated anomaly detection may be provided for applications in a computing environment based on the set of identified critical performance metrics. Consistent with present disclosures, the critical performance metrics may be monitored to facilitate the automatic detection of anomalies. Once detected, the anomalies may be automatically resolved based on initiation of automatically determined resolution actions.

Figure 7:
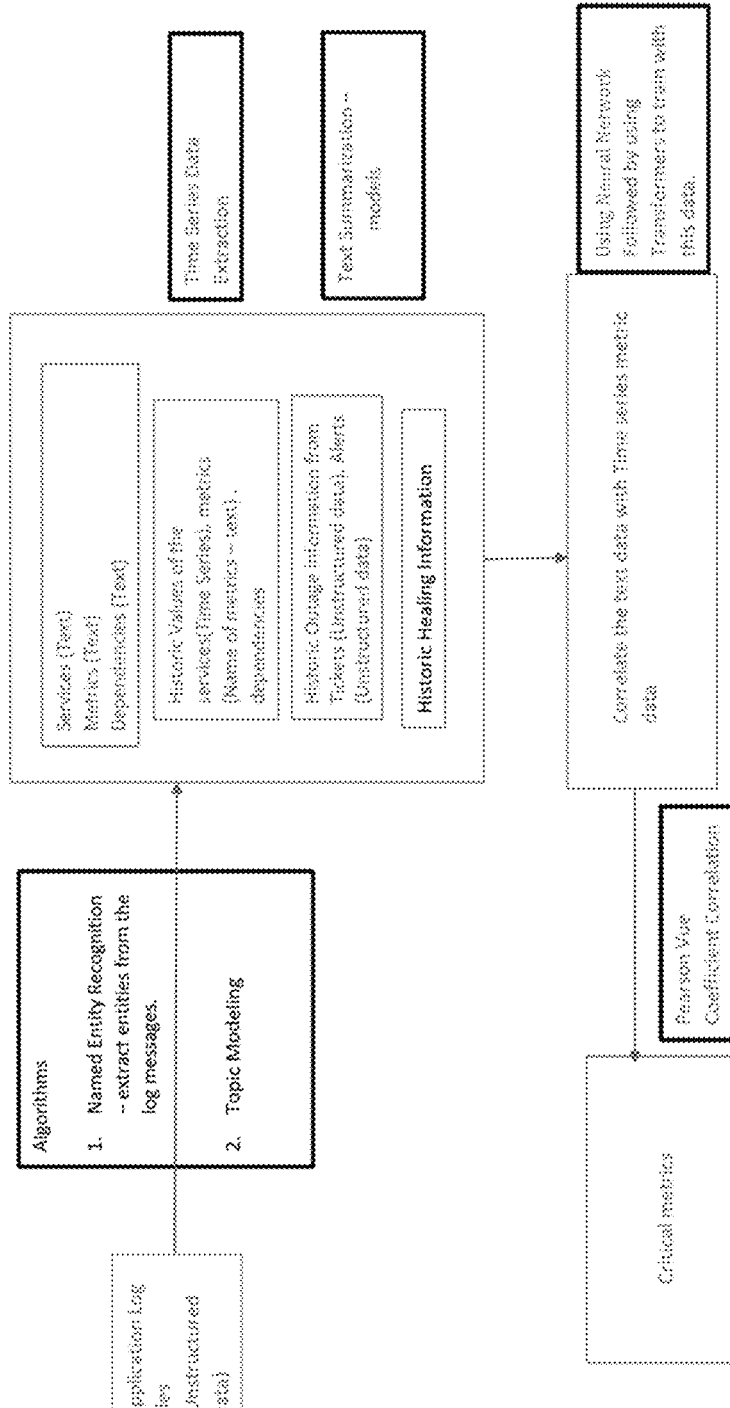
FIG. 7 is a technical details diagram of an exemplary process for implementing a method for facilitating management of computing metrics by providing automated identification of critical application, system, and infrastructure metrics via artificial intelligence and machine learning.

FIG. 7 is a technical details diagram 700 of an exemplary process for implementing a method for facilitating management of computing metrics by providing automated identification of critical application, system, and infrastructure metrics via artificial intelligence and machine learning. In FIG. 7, a set of critical application, system, and infrastructure metrics may be automatically identified.

As illustrated in FIG. 7, unstructured data such as, for example, application log files may be aggregated. Algorithms such as, for example, named entity recognition algorithms and topic modeling algorithms may be used to parse and structure the aggregated data. The aggregated data may be parsed to generate structured data sets that include services data, metrics data, and dependencies data. The structured data sets may also include time series data such as, for example, historical values of the services as well as historical outage information from service tickets, historical alert information, and historical healing information. Consistent with present disclosures, the time series data may be extracted from the structured data set and textual data may be summarized.

Then, the textual data may be correlated with the time series data of various performance metrics to identify criticality characteristics for the performance metrics. Consistent with present disclosures, the correlation may be facilitated by using analysis techniques such as, for example, convolutional neural network analysis to identify relationships and/or connections between data points in the summary and data points in the time series data. A set of critical performance metrics may be identified based on the corresponding criticality characteristics and coefficient correlation.

Accordingly, with this technology, an optimized process for facilitating management of computing metrics by providing automated identification of critical application, system, and infrastructure metrics via artificial intelligence and machine learning is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating automated management of computing metrics, the method being implemented by at least one processor, the method comprising:

aggregating, by the at least one processor via an application programming interface, unstructured data from at least one computing component, the unstructured data including application log data;

parsing, by the at least one processor via a topic modeling algorithm comprising a statistical model algorithm with an unsupervised machine learning algorithm, semantics of the unstructured data to generate at least one structured data set, each of the at least one structured data set including textual data;

extracting, by the at least one processor, time series data from the at least one structured data set, the time series data relating to at least one performance metric of the at least one computing component;

generating, by the at least one processor using at least one model, a summary of the textual data in the at least one structured data set;

correlating, by the at least one processor using the at least one model, the summary of the textual data with the time series data;

determining, by the at least one processor using the at least one model, at least one characteristic for each of the at least one performance metric based on a result of the correlating, the at least one characteristic including a criticality characteristic;

detecting, by the at least one processor using the at least one model, at least one anomaly in the at least one performance metric;

determining, by the at least one processor using the at least one model, a first resolution action to remedy each of the at least one anomaly; and initiating automatically, by the at least one processor using the at least one model, a self-healing action comprising the first resolution action based on historical resolution data and providing additional computing resources that automatically resolves factors contributing to predicted errors associated with the detected at least one anomaly.

2. The method of claim 1, wherein the detecting the at least one anomaly comprises:

monitoring, by the at least one processor, each of the at least one performance metric based on the corresponding criticality characteristic to detect the at least one anomaly.

3. The method of claim 2, further comprising:

determining, by the at least one processor using the at least one model, at least one predicted error based on the monitoring of the at least one performance metric; and determining, by the at least one processor using the at least one model, a second resolution action to remedy each of the at least one predicted error.

4. The method of claim 3, wherein the first resolution action and the second resolution action are determined based on additional historical data that correspond to the at least one computing component, the historical data including at least one from among historical outage data from incident tickets, and historical alert data.

5. The method of claim 1, wherein the at least one computing component includes at least one from among an application component and an infrastructure component.

6. The method of claim 1, wherein the unstructured data is parsed by using a named entity recognition algorithm that classifies the unstructured data into a set of predefined data categories comprising names, locations, and quantities.

7. The method of claim 1, wherein the textual data includes service data, performance metric data, and dependency data, the performance metric data including application performance data, computing system performance data, and computing infrastructure performance data.

8. The method of claim 1, further comprising:

determining, by the at least one processor using the at least one model, at least one explanation for each of the at least one characteristic, wherein each of the at least one explanation includes information in a natural language format; and wherein each of the at least one explanation includes the textual data that contributed to the determining of the at least one characteristic.

9. The method of claim 1, wherein the at least one model includes at least one from among a large language model, a deep learning model, a neural network model, a natural language processing model, a machine learning model, a mathematical model, a process model, and a data model.

10. A computing device configured to implement an execution of a method for facilitating automated management of computing metrics, the computing device comprising:

a processor;
a memory; and
a communication interface coupled to each of the processor and the memory, wherein the processor is configured to:

aggregate, via an application programming interface, unstructured data from at least one computing component, the unstructured data including application log data;

parse semantics of the unstructured data to generate at least one structured data set via a topic modeling algorithm comprising a statistical model algorithm with an unsupervised machine learning algorithm, each of the at least one structured data set including textual data;

extract time series data from the at least one structured data set, the time series data relating to at least one performance metric of the at least one computing component;

generate, by using at least one model, a summary of the textual data in the at least one structured data set;

correlate, by using the at least one model, the summary of the textual data with the time series data;

determine, by using the at least one model, at least one characteristic for each of the at least one performance metric based on a result of the correlating, the at least one characteristic including a criticality characteristic;

detect, by the at least one processor using the at least one model, at least one anomaly in the at least one performance metric;

determine, by the at least one processor using the at least one model, a first resolution action to remedy each of the at least one anomaly; and initiate automatically, by the at least one processor using the at least one model, a self-healing action comprising the first resolution action based on historical resolution data and providing additional computing resources that automatically resolves factors contributing to predicted errors associated with the detected at least one anomaly.

11. The computing device of claim 10, wherein the processor is further configured to detect the at least one anomaly by:

monitoring each of the at least one performance metric based on the corresponding criticality characteristic.

12. The computing device of claim 11, wherein the processor is further configured to:

determine, by using the at least one model, at least one predicted error based on the monitoring of the at least one performance metric; and determine, by using the at least one model, a second resolution action to remedy each of the at least one predicted error.

13. The computing device of claim 12, wherein the processor is further configured to determine the first resolution action and the second resolution action based on additional historical data that correspond to the at least one computing component, the historical data including at least one from among historical outage data from incident tickets, and historical alert data.

14. The computing device of claim 10, wherein the at least one computing component includes at least one from among an application component and an infrastructure component.

15. The computing device of claim 10, wherein the processor is further configured to parse the unstructured data by using a named entity recognition algorithm that classifies the unstructured data into a set of predefined data categories comprising names, locations, and quantities.

16. The computing device of claim 10, wherein the textual data includes service data, performance metric data, and dependency data, the performance metric data including application performance data, computing system performance data, and computing infrastructure performance data.

17. The computing device of claim 10, wherein the processor is further configured to:
   determine, by using the at least one model, at least one explanation for each of the at least one characteristic,
   wherein each of the at least one explanation includes information in a natural language format; and
   wherein each of the at least one explanation includes the textual data that contributed to the determining of the at least one characteristic.

18. The computing device of claim 10, wherein the at least one model includes at least one from among a large language model, a deep learning model, a neural network model, a natural language processing model, a machine learning model, a mathematical model, a process model, and a data model.

19. A non-transitory computer readable storage medium storing instructions for facilitating automated management of computing metrics, the storage medium comprising executable code which, when executed by a processor, causes the processor to:
   aggregate, via an application programming interface, unstructured data from at least one computing component, the unstructured data including application log data;
   parse semantics of the unstructured data to generate at least one structured data set via a topic modeling algorithm comprising a statistical model with an unsupervised machine learning algorithm, each of the at least one structured data set including textual data;
   extract time series data from the at least one structured data set, the time series data relating to at least one performance metric of the at least one computing component;
   generate, by using at least one model, a summary of the textual data in the at least one structured data set;
   correlate, by using the at least one model, the summary of the textual data with the time series data;
   determine, by using the at least one model, at least one characteristic for each of the at least one performance metric based on a result of the correlating, the at least one characteristic including a criticality characteristic;
   detect, by the at least one processor using the at least one model, at least one anomaly in the at least one performance metric;
   determine, by the at least one processor using the at least one model, a first resolution action to remedy each of the at least one anomaly; and
   initiate automatically, by the at least one processor using the at least one model, a self-healing action comprising the first resolution action based on historical resolution data and providing additional computing resources that automatically resolves factors contributing to predicted errors associated with the detected at least one anomaly.

20. The storage medium of claim 19, wherein, when executed by the processor, the executable code further causes the processor to detect the at least one anomaly by:
   monitoring each of the at least one performance metric based on the corresponding criticality characteristic.

* * * * *